(No Model.)

W. W. CARTER.
EGG BEATER.

No. 270,015. Patented Jan. 2, 1883.

Witnesses.
John Edwards Jr.
Chas. B. Meredan

Inventor.
William W. Carter
By James Shepard
Atty

UNITED STATES PATENT OFFICE.

WILLIAM W. CARTER, OF BRISTOL, CONNECTICUT.

EGG-BEATER.

SPECIFICATION forming part of Letters Patent No. 270,015, dated January 2, 1883.

Application filed April 6, 1882. (No model.)

*To all whom it may concern:*

Be it known that I, WILLIAM W. CARTER, of Bristol, in the county of Hartford and State of Connecticut, have invented certain new and useful Improvements in Egg-Beaters, of which the following is a specification.

My invention relates to improvements in egg-beaters, in which a suitable vessel is provided with a closely-fitting cover, which cover carries the beater and its shaft. The beater-shaft has a scroll-spring connected to it at one point and a strap connected at another point and coiled around the shaft, said spring and strap being inclosed in a chamber which surmounts the cover.

The objects of my improvements are to combine the beater with a suitable vessel and to furnish convenient means for rapidly revolving the beater. I attain these objects by the mechanism illustrated in the accompanying drawings, in which—

Figure 1:
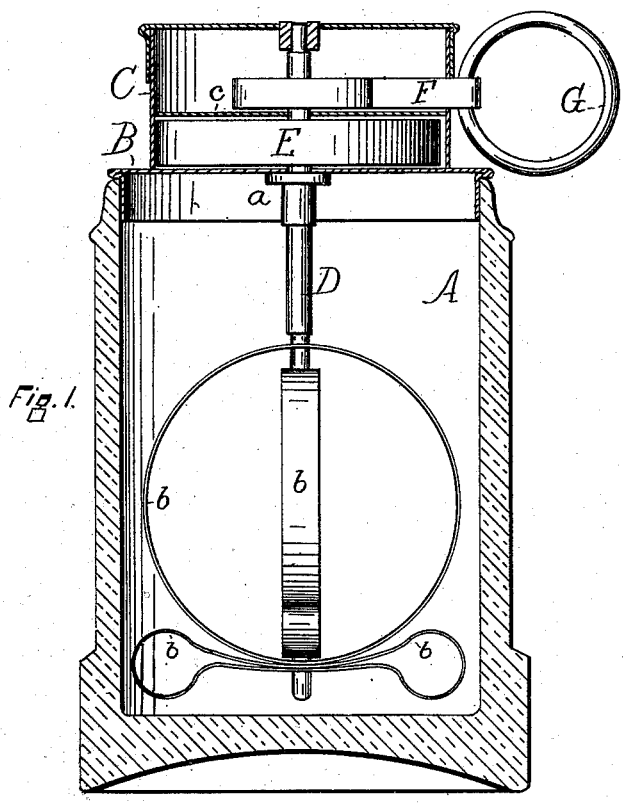
Figure 2:
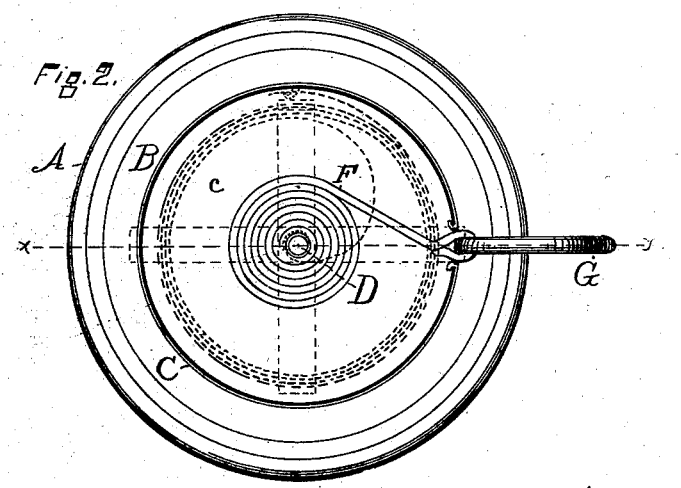

Figure 1 is a vertical section of the vessel and spring-box on line $x\ x$ of Fig. 2, showing the beater, the spring, and the strap in elevation; and Fig. 2 is a plan view of the same with the upper part of the spring-box removed.

A designates the vessel, which may be made of glass or other suitable material and in any desired form. I prefer to make its outer side walls fluted vertically, so that it may be held by one hand while the beater is being revolved within it.

B designates the cover, having a flange, $a$, which in the present instance projects downward inside the vessel A. It is essential that the cover shall be so fitted to the vessel that it may be accurately seated in proper position thereon, and so as not to be easily revolved or moved out of place. On the upper side of the cover is a box or chamber, C, which, with the cover, furnishes the bearings for the shaft D, to the lower end of which shaft any suitable beater, $b$, may be attached.

A flat scroll-spring, E, like an ordinary clock-spring, is connected to the shaft D by its inner end, while its outer end is connected to the side of the box C. Above the spring E a dividing-disk is slipped over the shaft D and into the spring-box C.

To the shaft D, at a point just above the disk $c$, I secure one end of a strap, F, and to the other end of said strap I secure a ring or handle, G, the strap passing through an orifice in the side of the box C, so as to bring the handle G upon the outside. When the spring is unwound, as indicated by the broken lines in Fig. 2, the strap F is coiled around the shaft D and is within the box C, as shown. The spring and the strap are coiled in opposite directions.

The operation is as follows: After placing the material to be beaten within the vessel the cover is placed thereon, as shown. With one hand the operator takes hold of the vessel and with the other hand hold of the handle G and pulls out the strap. This revolves the beater rapidly and winds up the spring. The hold upon the handle is then slackened sufficiently to allow the spring to revolve the beater rapidly in the reverse direction and to wind up the strap. The strap is again drawn out and allowed to return, and so on repeatedly as long as may be desired. By attaching the strap to the shaft at a point above the spring it may be attached without the employment of a drum, so that the coils may be as small as possible, whereby a given length of strap will impart more revolutions to the shaft and a greater speed than can be the case when a strap or cord is passed over a drum of any considerable diameter. This arrangement also permits the employment of a long spring with large coils. The strap and the spring can be relatively adjusted to wind the spring to any extent desired.

I claim as my invention—

1. The cover provided with the spring-box, and having the revolving beater mounted thereon, with the spring attached to the beater-shaft at one point and the pulling-strap attached to said shaft at another point, substantially as described, and for the purpose specified.

2. The combination of the vessel with its closely-fitting cover, spring-box, beater, spring, and strap, the operating parts being supported and held in proper position within the vessel by the cover, substantially as described, and for the purpose specified.

WILLIAM W. CARTER.

Witnesses:
ASAHEL BROCKETT,
BENJ. F. HAWLEY.